US011238576B2

(12) United States Patent
Miki et al.

(10) Patent No.: US 11,238,576 B2
(45) Date of Patent: Feb. 1, 2022

(54) INFORMATION PROCESSING DEVICE, DATA STRUCTURE, INFORMATION PROCESSING METHOD, AND NON-TRANSITORY COMPUTER READABLE STORAGE MEDIUM

(71) Applicant: Yahoo Japan Corporation, Tokyo (JP)

(72) Inventors: Yuma Miki, Tokyo (JP); Yukihiro Tagami, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 365 days.

(21) Appl. No.: 16/240,580

(22) Filed: Jan. 4, 2019

(65) Prior Publication Data

US 2019/0220969 A1 Jul. 18, 2019

(30) Foreign Application Priority Data

Jan. 18, 2018 (JP) .............................. JP2018-006575

(51) Int. Cl.
*G06T 7/00* (2017.01)
*G06N 5/04* (2006.01)
*G06N 3/08* (2006.01)
*G06N 20/00* (2019.01)

(52) U.S. Cl.
CPC ............ *G06T 7/0002* (2013.01); *G06N 3/08* (2013.01); *G06N 5/047* (2013.01); *G06N 20/00* (2019.01); *G06T 2207/20081* (2013.01); *G06T 2207/20224* (2013.01); *G06T 2207/30242* (2013.01)

(58) Field of Classification Search
CPC ........ G06T 7/0002; G06N 20/00; G06N 3/08; G06N 5/047
See application file for complete search history.

(56) References Cited

U.S. PATENT DOCUMENTS

| | | | |
|---|---|---|---|
| 9,788,907 B1* | 10/2017 | Alvi ..................... | A61B 5/0013 |
| 10,383,694 B1* | 8/2019 | Venkataraman ... | A61B 1/00006 |
| 10,758,309 B1* | 9/2020 | Chow ................ | A61B 1/00009 |
| 11,062,479 B2* | 7/2021 | Steenhoek .............. | G06F 16/51 |
| 2016/0283795 A1* | 9/2016 | Laska ............... | G08B 13/19676 |
| 2016/0300383 A1* | 10/2016 | Liu ........................... | G06T 7/521 |
| 2017/0270593 A1* | 9/2017 | Sherman ................ | G06N 3/082 |
| 2018/0101768 A1* | 4/2018 | Laine ...................... | G06N 3/08 |
| 2018/0184062 A1* | 6/2018 | Hariri ....................... | G06T 7/90 |

(Continued)

FOREIGN PATENT DOCUMENTS

JP 2015-018336 A 1/2015

*Primary Examiner* — Mia M Thomas
(74) *Attorney, Agent, or Firm* — Procopio, Cory, Hargreaves & Savitch LLP

(57) ABSTRACT

An information processing device includes a communication unit that acquires first image data in which an observation value observed at a time t is used as a pixel value and a learning processing unit that generates second image data in which an observation value predicted to be observed at a time t+n after the time t is used as a pixel value from the first image data acquired by the acquiring unit based on a learning model obtained by machine learning using the first image data, in which the machine learning occurs based on a comparison of the first image data in which an observation value observed at a target time is used as a pixel value and the second image data in which an observation value predicted to be observed at the target time is used as a pixel value.

18 Claims, 11 Drawing Sheets

(56) References Cited

U.S. PATENT DOCUMENTS

| | | | |
|---|---|---|---|
| 2018/0260697 A1* | 9/2018 | Sun | G06N 3/08 |
| 2018/0304151 A1* | 10/2018 | Hicks | G06F 3/14 |
| 2018/0322623 A1* | 11/2018 | Memo | G06N 3/084 |
| 2019/0114762 A1* | 4/2019 | Liberatori, Jr. | G06F 16/5838 |
| 2019/0130427 A1* | 5/2019 | Sugimoto | G06F 16/29 |
| 2019/0188484 A1* | 6/2019 | Lecue | G06F 16/2264 |
| 2019/0236782 A1* | 8/2019 | Amit | A61B 10/0041 |
| 2019/0313963 A1* | 10/2019 | Hillen | G06N 3/0454 |
| 2019/0325306 A1* | 10/2019 | Zhu | G06N 3/08 |
| 2019/0385042 A1* | 12/2019 | Lee | G06N 3/0436 |
| 2019/0385358 A1* | 12/2019 | Chui | G06T 5/50 |
| 2020/0050965 A1* | 2/2020 | Harvill | G06N 20/00 |
| 2020/0175361 A1* | 6/2020 | Che | G06N 3/0454 |
| 2020/0184721 A1* | 6/2020 | Ge | G06N 3/08 |
| 2020/0265295 A1* | 8/2020 | Itou | G06F 16/9024 |
| 2020/0292463 A1* | 9/2020 | Kang | G01N 21/8806 |
| 2020/0311580 A1* | 10/2020 | Tavshikar | G06N 20/00 |
| 2021/0004646 A1* | 1/2021 | Guizilini | G06T 7/20 |
| 2021/0056363 A1* | 2/2021 | Song | G06K 9/6268 |
| 2021/0097691 A1* | 4/2021 | Liu | G06N 3/0454 |
| 2021/0125402 A1* | 4/2021 | Chui | G06T 5/50 |
| 2021/0125403 A1* | 4/2021 | Chui | G06F 16/78 |
| 2021/0264188 A1* | 8/2021 | Matsumura | G06K 9/6217 |

* cited by examiner

INFORMATION PROCESSING DEVICE, DATA STRUCTURE, INFORMATION PROCESSING METHOD, AND NON-TRANSITORY COMPUTER READABLE STORAGE MEDIUM

CROSS-REFERENCE TO RELATED APPLICATION

The present application claims priority to, and incorporates by reference, the entire contents of Japanese Patent Application No. 2018-006575 filed in Japan on Jan. 18, 2018.

BACKGROUND

1. Field

Example implementations are directed to an information processing device, a data structure, an information processing method, and a non-transitory computer readable storage medium.

2. Related Art

A related art technique is directed to calculating a congestion degree in each of a plurality of past time zones of a target area as a time zone congestion degree with reference to past positioning information of a mobile terminal in the target area, clustering the plurality of time zone congestion degrees, and generating a congestion degree pattern used for predicting a future congestion degree in the target area (for example, see JP 2015-18336 A).

However, in the related technique, a future congestion degree is obtained for each spot or for each area, and thus there is a related art problem in that a processing load increases, and data management is complicated. Further, such a related art problem is entirely a point which is common to all application fields in which a certain observation value, such as the congestion degree, is associated with spatial coordinates (e.g., arbitrary spatial coordinates), such as position coordinates on a map.

SUMMARY

According to one aspect of an example implementation, an information processing device includes a communication unit configured to acquire first image data in which an observation value observed at a certain time t is used as a pixel value. The information processing device includes a learning processing unit that generates second image data in which an observation value predicted to be observed at a time t+n after the time t is used as a pixel value from the first image data acquired by the communication unit on the basis of a learning model obtained by machine learning using the first image data, wherein the machine learning is machine learning based on a comparison of the first image data in which an observation value observed at a target time is used as a pixel value and the second image data in which an observation value predicted to be observed at the target time is used as a pixel value.

The above and other objects, features, advantages and technical and industrial significance of this inventive concept will be better understood by reading the following detailed description, when considered in connection with the accompanying drawings.

DETAILED DESCRIPTION

An information processing device, a data structure, an information processing method, and a program (e.g., non-transitory computer readable medium including stored instructions executed by a microprocessor) will be described with reference to the appended drawings.

Overview

An information processing device is realized by one or more processors. The information processing device obtains image data (hereinafter referred to as "actual image data") in which an observation value observed at a time t (e.g., a certain time) is used as a pixel value. The observation value is, for example, a value indicating a degree of congestion of people at a certain spot, i.e., a congestion degree. In a case in which the observation value is the congestion degree, the actual image data may be indicated by a heat map in which color parameters such as a hue, a saturation, and brightness (e.g., luminance) are used as pixel values in accordance with the size of congestion degree. The actual image data is an example of "first image data" or "first multi-dimensional sequence data".

If the actual image data is acquired, the information processing device generates image data in which an observation value predicted to be observed at a time t+n after a time t is used as a pixel value (hereinafter referred to as "predicted image data"), from the acquired actual image data of the time t on the basis of a learning model that performs machine learning using the actual image data of another time t # (for example, a time of a period, such as a predetermined period, prior to the time t). The predicted image data is an example of "second image data" or "second multi-dimensional sequence data".

For example, the learning model is obtained by machine learning based on an addition result of the actual image data at a certain time t # in the past and the predicted image data at a time t #+n after the time t # in the past. "n" indicates a period in which the observation value is obtained, for example, 1. The generated predicted image data has a data format similar to the actual image data. The term "similar" means that, for example, when the actual image data is a heat map in which a size of a congestion degree is expressed by grayscale brightness, the predicted image data is also a heat map in which a size of a congestion degree is expressed by grayscale brightness. With this process, for example, it is possible to predict a future observation value which is desired to be finally obtained on the basis of an image, without considering a feature quantity such as the presence or absence of a building in which people are likely to be crowded, a shape of a land, or a shape of a road network or a railroad network. As a result, it is possible to obtain a future observation value suitably, for example, more easily at a lower load.

First Example Implementation

Overall Structure

Figure 1:
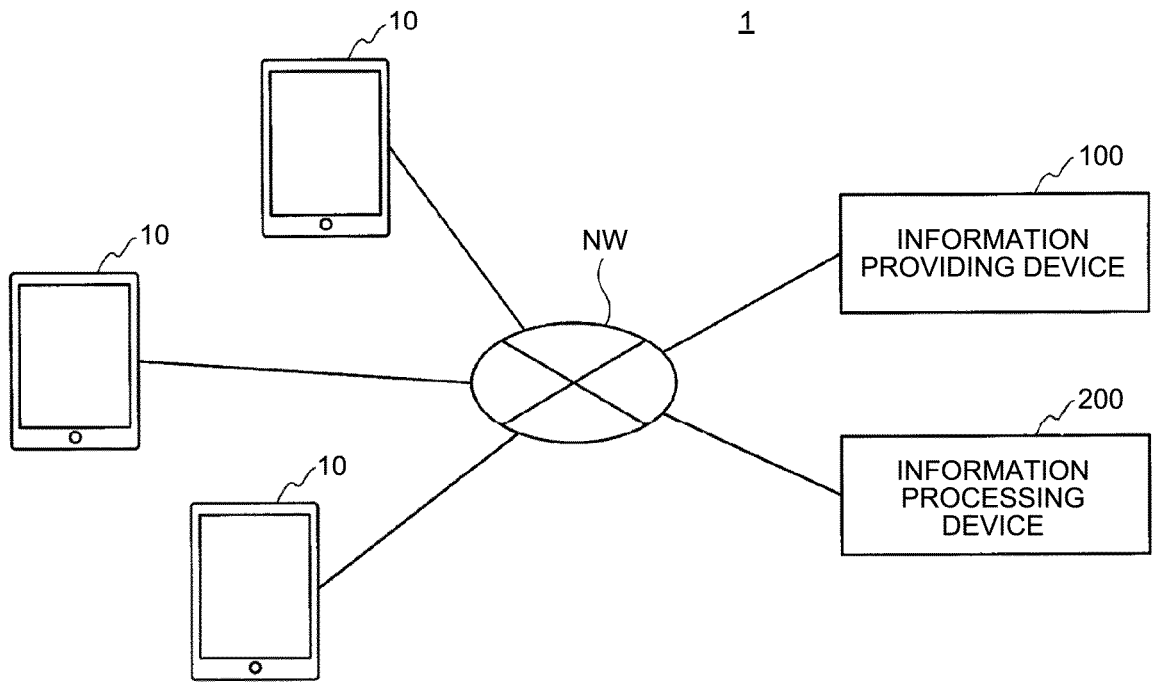
FIG. 1 a diagram illustrating an example of an information processing system 1 including an information processing device 200 in a first example implementation.

FIG. 1 is a diagram illustrating an example of an information processing system 1 including an information processing device 200 in the first example implementation. The information processing system 1 in the first example implementation includes, for example, one or more terminal devices 10, an information providing device 100, and the information processing device 200. These devices are connected to one another via a network NW.

Each device illustrated in FIG. 1 transmits and receives various information via the network NW. Examples of the network NW include the Internet, a wide area network (WAN), a local area network (LAN), a provider terminal, a wireless communication network, a wireless base station, a dedicated line, and the like. All combinations of the respective devices illustrated in FIG. 1 need not be able to perform communication with each other, and the network NW may optionally include a local network in part.

The terminal device 10 is a terminal device including an input device, a display device, a communication device, a storage device, and an arithmetic device such as a mobile phone such as a smartphone, a tablet terminal, or various kinds of personal computers. The communication device includes a network card such as a network interface card (NIC), a wireless communication module, and the like. The terminal device 10 activates an agent such as a user agent (UA) such as a web browser or an application program (e.g., non-transitory computer readable medium including stored instructions executed by a microprocessor) and transmits a request corresponding to an input of a user to the information providing device 100. Further, the terminal device 10 which has started the UA displays various kinds of images on the display device on the basis of information acquired from the information providing device 100.

The information providing device 100 is, for example, a web server that provides a web page to the terminal device 10 in response to a request from a web browser. The web page includes content such as text, a still image, a moving image, or a sound. For example, in a case in which the web page provides a map image, content includes a map image and a heat map in which the congestion degree of people on the map is expressed by color. The information providing device 100 may be an application server that provides the above content to the terminal device 10 in response to a request from an application program (e.g., non-transitory computer readable medium including stored instructions executed by a microprocessor).

For example, the information processing device 200 acquires actual image data in which a congestion degree at a time t (e.g., a certain time) in an area (e.g., a certain area) is used as a pixel value from the information providing device 100, and generates predicted image data in which the congestion degree of a future time t+n in the area is used as a pixel value. Then, the information processing device 200 transmits the generated predicted image data to the information providing device 100 which is an acquisition source of the actual image data. Upon receiving the predicted image data, the information providing device 100 provides the predicted image data of the future time t+n to the terminal device 10 as content.

Configuration of Information Providing Device

Figure 2:
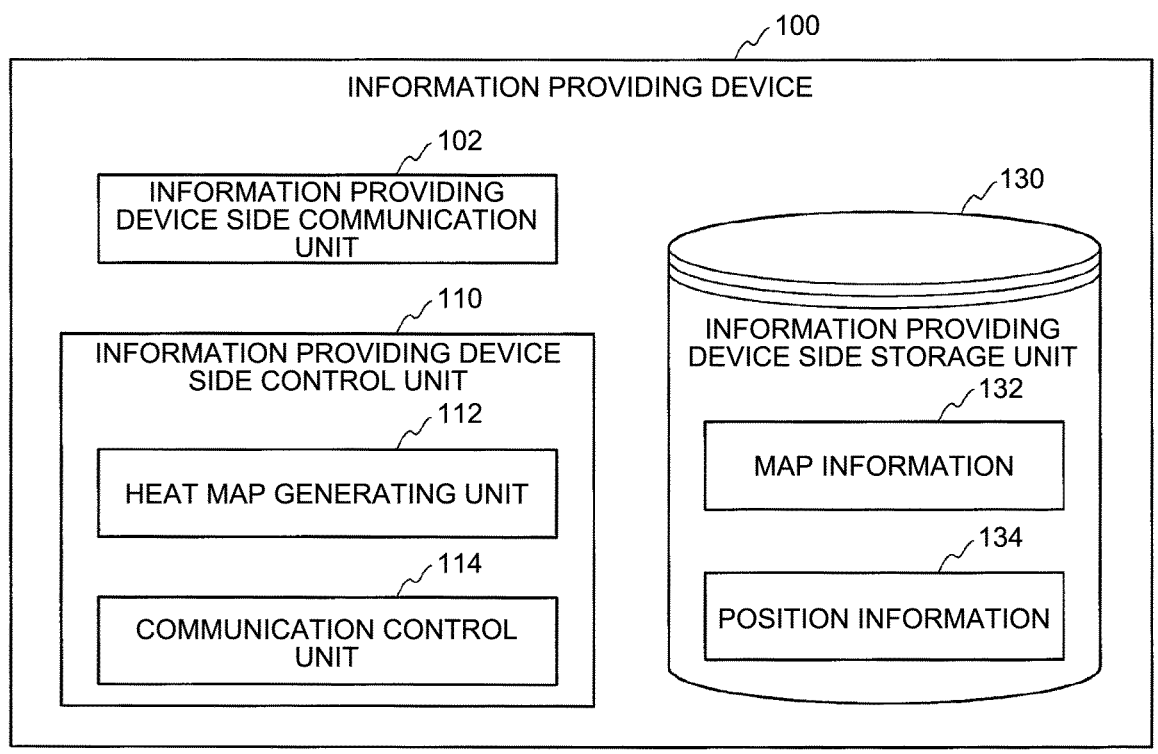
FIG. 2 is a diagram illustrating an example of a configuration of an information providing device 100 in the first example implementation.

FIG. 2 is a diagram illustrating an example of a configuration of the information providing device 100 in the first example implementation. As illustrated, the information providing device 100 includes, for example, an information providing device side communication unit 102, an information providing device side control unit 110, and an information providing device side storage unit 130.

The information providing device side communication unit 102 includes, for example, a communication interface such as an NIC. The information providing device side communication unit 102 communicates with the terminal device 10 via the network NW, acquires a web browser request and an application request from the terminal device 10, and acquires position information of the terminal device 10.

The information providing device side control unit 110 includes, for example, a heat map generating unit 112 and a communication control unit 114. These constituent elements are implemented, for example, such that a processor such as a central processing unit (CPU) executes a program stored in the information providing device side storage unit 130 (e.g., non-transitory computer readable medium including stored instructions executed by a microprocessor). Further, part or all of the components of the information providing device side control unit 110 may be realized by hardware (e.g., circuitry) such as a large scale integration (LSI), an application specific integrated circuit (ASIC), a field-programmable gate array (FPGA), a graphics processing unit (GPU) or may be realized by cooperation of software and hardware.

The information providing device side storage unit 130 is realized by a storage device such as a hard disc drive (HDD), a flash memory, an electrically erasable programmable read only memory (EEPROM), a read only memory (ROM), or a random access memory (RAM). In addition to various kinds of programs executed by a processor such as firmware and an application program (e.g., non-transitory computer readable medium including stored instructions executed by a microprocessor), map information 132, position information 134, and the like are stored in the information providing device side storage unit 130. The map information 132 includes, for example, a map image provided to the terminal device 10 as content and position coordinates of a building or the like on the map. The position information 134 includes position coordinates of each terminal device 10 and an acquisition time of the position coordinates.

The heat map generating unit 112 sequentially generates the actual image data indicated by the heat map at a period n, such as a predetermined period (for example, 20 minutes). For example, the heat map generating unit 112 extracts one or more position coordinates corresponding to a target period from a plurality of position coordinates with reference to the acquisition time of the position coordinates of the terminal device 10. The heat map generating unit 112 maps the extracted position coordinates onto a map indicated by the map information 132 and derives the number of mapped position coordinates as the congestion degree of people. Then, the heat map generating unit 112 generates data by causing the heat map obtained by replacing the congestion degree with the pixel value to be superimposed on the map image indicated by the map information 132 as the actual image data. The actual image data is indicated as, for example, a three-dimensional tensor (e.g., third-layer tensor) data in which the congestion degree is associated with each coordinate of the map.

Figure 3:
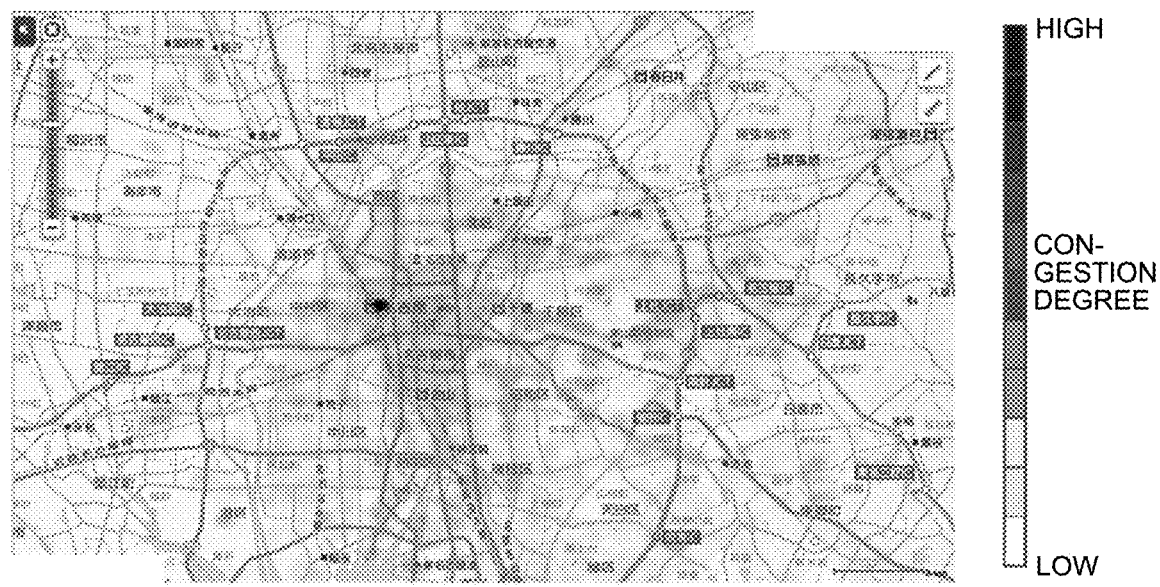
FIG. 3 is a diagram illustrating an example of actual image data.

FIG. 3 is a diagram illustrating an example of the actual image data. As in the example illustrated in FIG. 3, in the actual image data, the heat map having a transmittance (e.g., predetermined transmittance) is superimposed on the map image. The size of the pixel value of the heat map, that is, the size of the congestion degree may be indicated by, for example, a number of gradations (e.g., predetermined number of gradations) among hues from pink to blue. As the actual image data is provided to the terminal device 10 as the content, the user using the terminal device 10 can intuitively understand spots having congestion in accordance with on a color depth, a hue, or the like.

The communication control unit 114 controls the information providing device side communication unit 102 such that the actual image data generated by the heat map generating unit 112 is transmitted to the terminal device 10 as content. Further, the communication control unit 114 controls the information providing device side communication unit 102 such that the actual image data generated by the heat map generating unit 112 is transmitted to the information processing device 200.

Configuration of Information Processing Device

Figure 4:
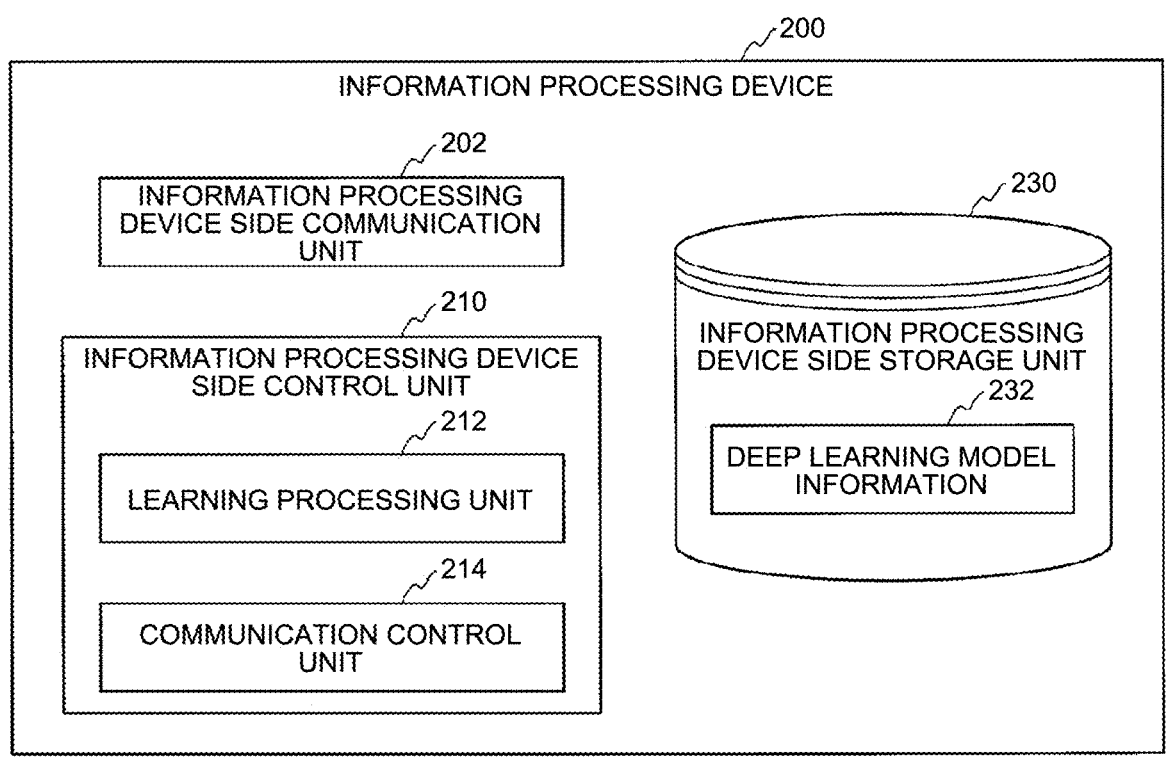
FIG. 4 is a diagram illustrating an example of a configuration of an information processing device 200 in the first example implementation.

FIG. 4 is a diagram illustrating an example of a configuration of the information processing device 200 in the first example implementation. As illustrated in FIG. 4, the information processing device 200 includes, for example, an information processing device side communication unit 202, an information processing device side control unit 210, and an information processing device side storage unit 230.

The information processing device side communication unit 202 includes, for example, a communication interface such as an NIC. The information processing device side communication unit 202 communicates with the information providing device 100 via the network NW and acquires the actual image data from the information providing device 100. The information processing device side communication unit 202 is an example of an "acquiring unit".

The information processing device side control unit 210 includes, for example, a learning processing unit 212 and a communication control unit 214. These components are implemented, for example, such that a processor such as a CPU executes a program stored in the information processing device side storage unit 230 (e.g., non-transitory computer readable medium including stored instructions executed by a microprocessor). Further, some or all of the components of the information processing device side control unit 210 may be realized by hardware (circuitry) such as an LSI, an ASIC, an FPGA, or a GPU or may be realized by cooperation of software and hardware.

The information processing device side storage unit 230 is realized by a storage device such as an HDD, a flash memory, an EEPROM, a ROM, a RAM, or the like. The information processing device side storage unit 230 stores deep learning model information 232 and the like in addition to various kinds of programs executed by a processor such as firmware and an application program (e.g., non-transitory computer readable medium including stored instructions executed by a microprocessor).

The deep learning model information 232 is information specifying a learning model (e.g., a learning device) which is referred to by the learning processing unit 212. The learning model is, for example, a PredNet 300. The PredNet 300 is a deep predictive coding network(s) which was derived from the principle of predictive coding in neuroscience and is realized by a plurality of neural networks, including but not limited to at least a deep convolutional recurrent neural network.

The deep learning model information 232 includes, for example, coupling information indicating how neurons (e.g., units) included in each of an input layer, one or more hidden layers (e.g., intermediate layers), and an output layer constituting each neural network included in the PredNet 300 (e.g., deep convolutional recurrent neural network) are coupled with one another and various kinds of information such as a coupling coefficient assigned to data which is input or output between coupled neurons. The coupling information includes but is not limited to, for example, information such as the number of neurons included in each layer, information designating a neuron with which each neuron is coupled, an activation function for realizing each neuron, a gate formed between neurons in the hidden layer. The activation function for realizing the neuron may be, for example, a normalized linear function (e.g., a ReLU function), a sigmoid function, a step function, any other function, or the like. The gate selectively passes or weights data transmitted between neurons in accordance with, for example, a value (for example, 1 or 0) returned by the activation function. The coupling coefficient is a parameter of the activation function, and includes, for example, a weight assigned to output data when data is output from a neuron of a certain layer to a neuron of a deeper layer in the hidden layer of the neural network. Further, the coupling coefficient may include a bias component specific to each layer or the like.

The learning processing unit 212 generates (e.g., constructs) the PredNet 300 with reference to the deep learning model information 232, performs various kinds of calculations using the actual image data acquired by the information processing device side communication unit 202 as an input, and generates predicted image data.

The communication control unit 214 controls the information processing device side communication unit 202 such that the predicted image data generated by the learning processing unit 212 is transmitted to the information providing device 100.

Process Flow at Time of Operation

Figure 5:
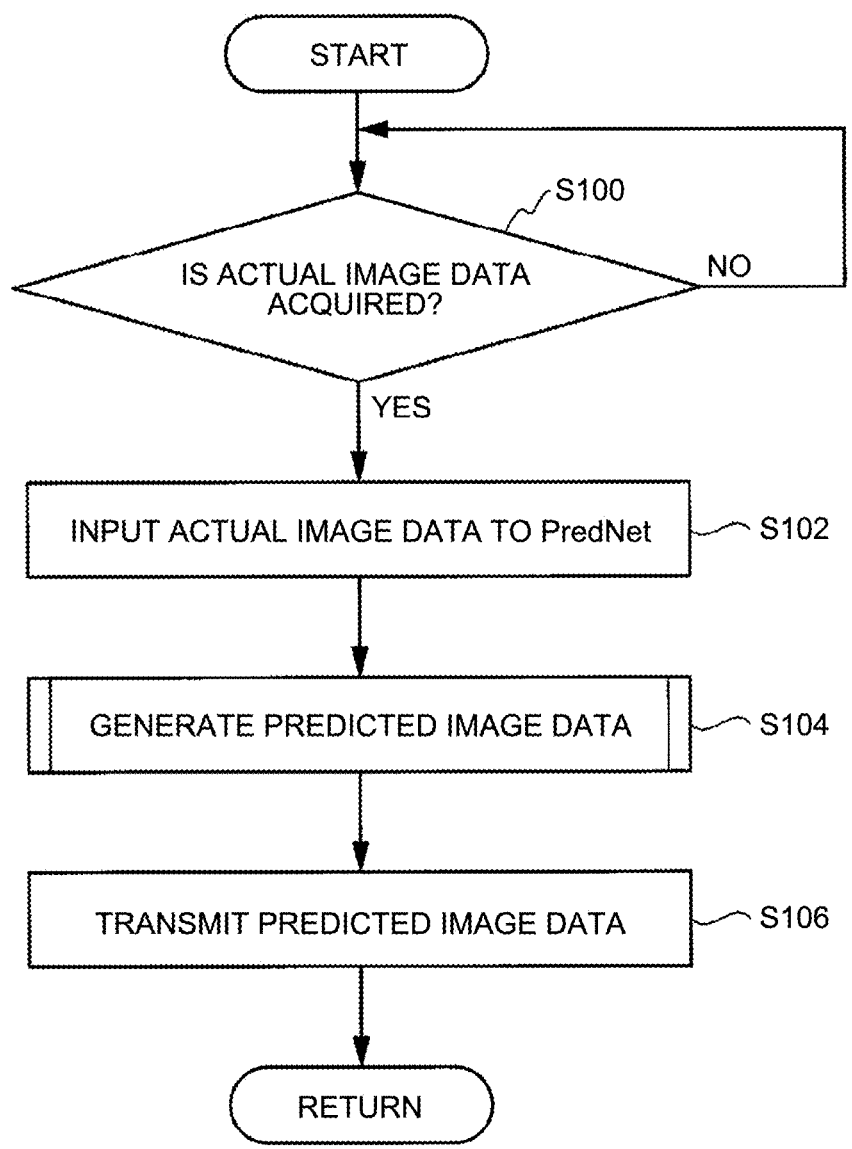
FIG. 5 is a flowchart illustrating a flow of a series of processes when an operation is performed by an information processing device side control unit 210.

A flow of a series of processes when an operation is performed by the information processing device side control unit 210 will be described below with reference to a flowchart. The term "when an operation is performed" indicates a state in which a learning model learned to a certain extent by the learning processing unit 212 is used. FIG. 5 is a flowchart illustrating a flow of a series of processes when an operation is performed by the information processing device side control unit 210. A process of the present flowchart may be repeated.

First, the learning processing unit 212 is on standby until the information processing device side communication unit 202 acquires the actual image data from the information providing device 100 (S100), and when the actual image data is acquired by the information processing device side communication unit 202, the learning processing unit 212 inputs the actual image data to the PredNet 300 (S102), and generates the predicted image data in which the congestion degree of a future time t+n which is one period n after the time t at which the actual image data is generated in the information providing device 100 is used as the pixel value (S104).

Then, the communication control unit 214 controls the information processing device side communication unit 202 such that the predicted image data of the time t+n generated by the learning processing unit 212 is transmitted to the information providing device 100 (S106). Accordingly, the process of the present flowchart ends.

If the predicted image data is transmitted from the information processing device 200, the information providing device 100 receives the predicted image data and transmits the predicted image data to the terminal device 10 as content. As a result, the user using the terminal device 10 can understand a spot having congestion at the future time t+n.

Figure 6:
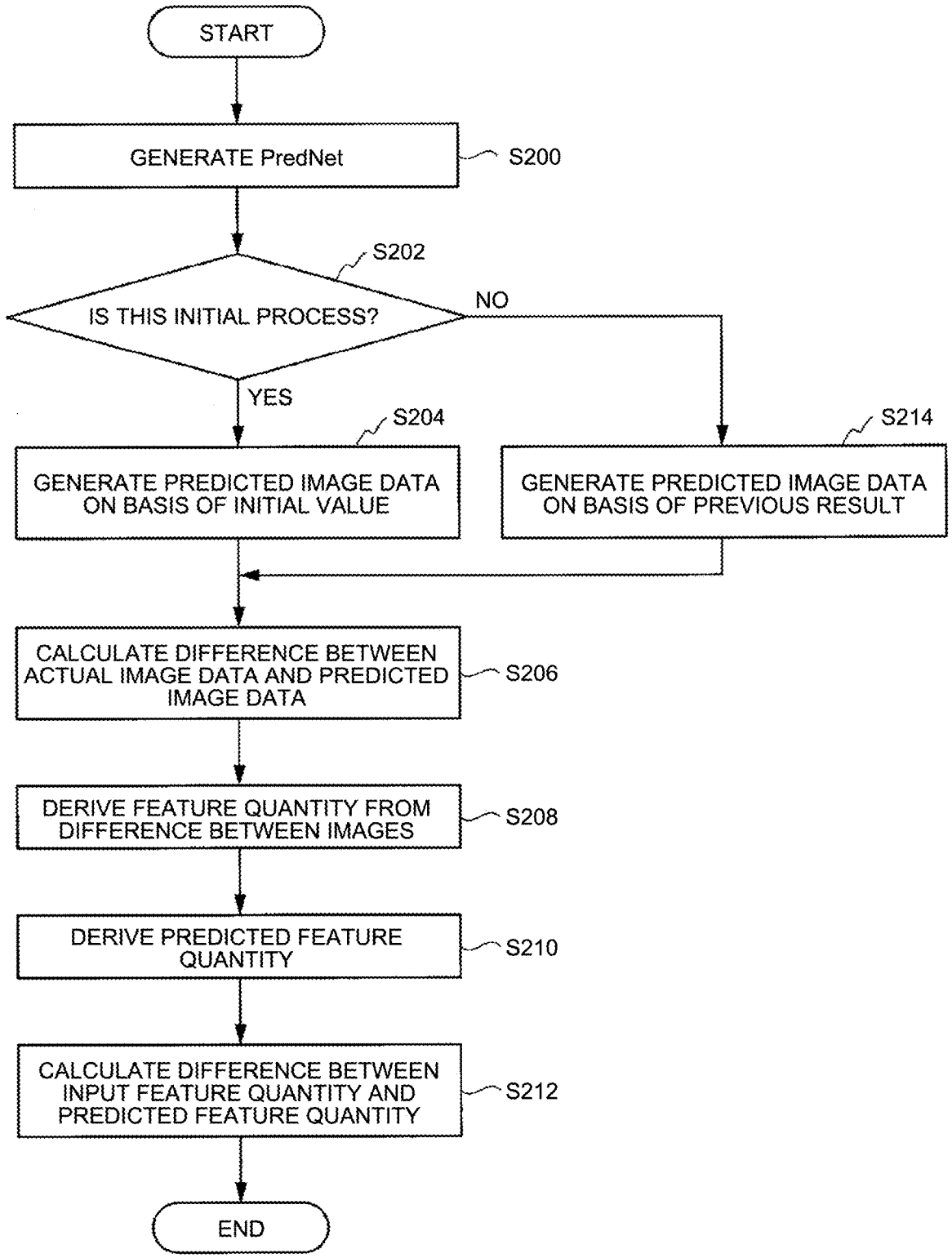
FIG. 6 is a flowchart illustrating an example of a detailed flow of a predicted image data generation process.

FIG. 6 is a flowchart illustrating an example of a detailed flow of a predicted image data generation process. A process of the present flowchart corresponds to the process of S104 described above.

First, the learning processing unit 212 generates the PredNet 300 with reference to the deep learning model information 232 (S200).

Figure 7:
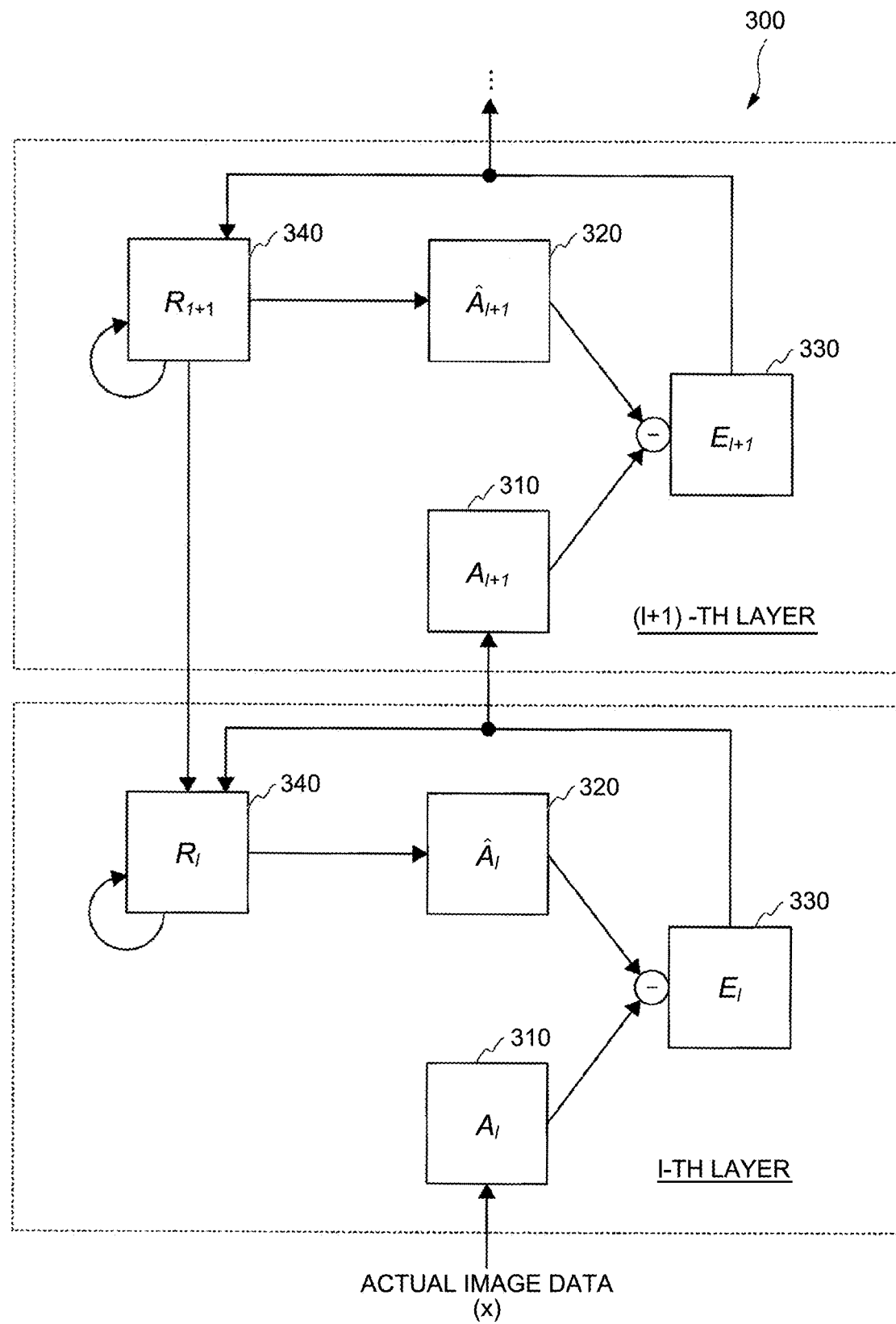
FIG. 7 is a diagram illustrating an example of the PredNet 300.
Figure 8:
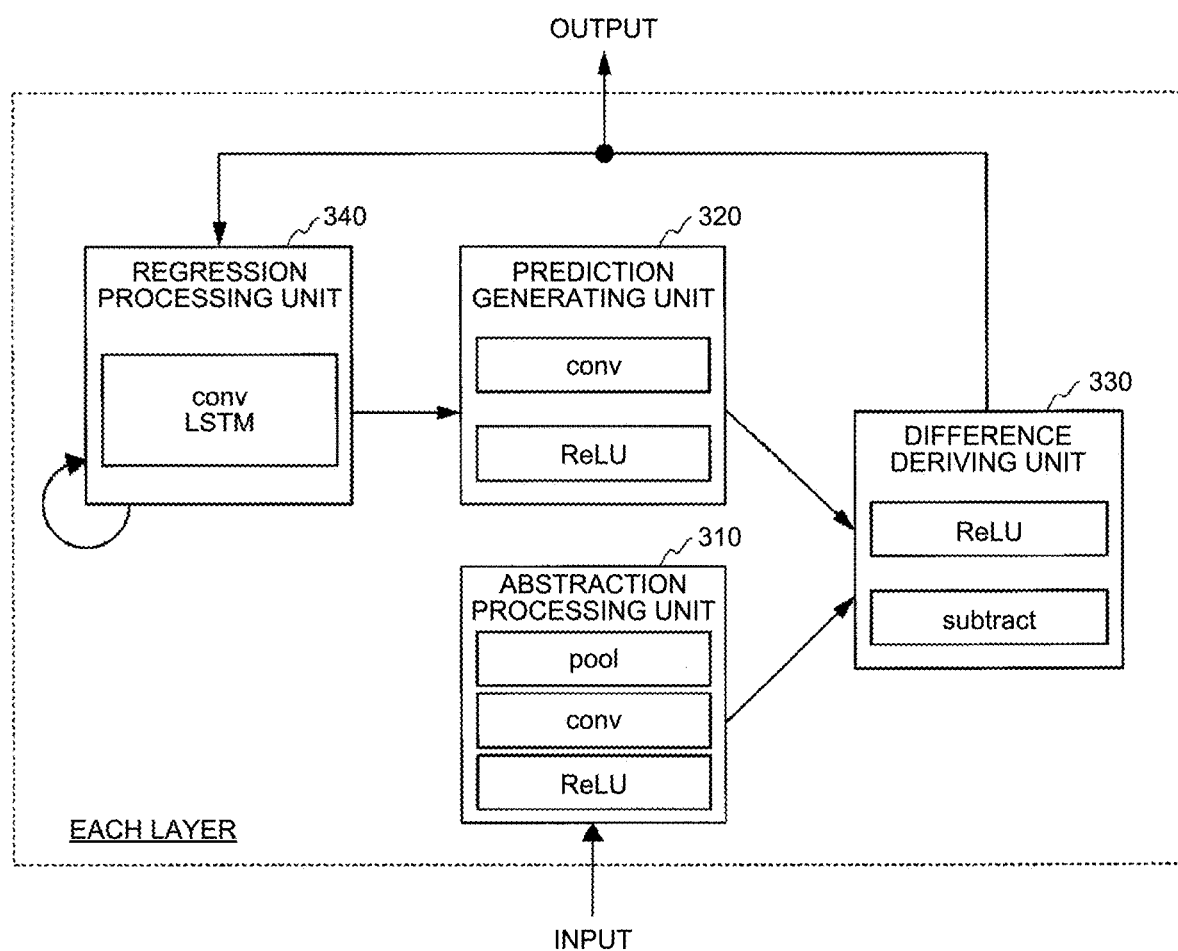
FIG. 8 is a diagram illustrating an example of the PredNet 300.

FIG. 7 and FIG. 8 are diagrams illustrating an example of the PredNet 300. For example, the PredNet 300 includes two or more layers, each layer locally predicts an observation value or a feature quantity constituting the observation value, and outputs a difference between a prediction result and an input to a subsequent layer. Each layer includes an abstraction processing unit 310, a prediction generating unit 320, a difference deriving unit 330, and a regression processing unit 340. Hereinafter, a processing result (output) of the abstraction processing unit 310 is referred to as "$A_l^t$", a processing result (output) of the prediction generating unit 320 is referred to as "$A(hat)_l^t$", a processing result (output) of the difference deriving unit 330 is referred to as "$E_l^t$", and a processing result (output) of the regression processing unit 340 is referred to as "$R_l^t$". "(hat)" indicates a hat symbol of an alphabet letter A.

The abstraction processing unit 310 performs a process based on Formula (1) and outputs the processing result $A_l^t$. The abstraction processing unit 310 may be realized by, for example, a convolutional neural network (CNN).

$$A_l^t = \begin{cases} x_t & \text{if } l = 0 \\ MAXPOOL(RELU(CONV(E_{l-1}^t))) & l > 0 \end{cases} \quad (1)$$

For example, when a layer l of a processing target is 0, that is, when the abstraction processing unit 310 of a first layer is a target, the abstraction processing unit 310 outputs input actual image data $x_t$ as the processing result $A_l^t$ without change.

Further, when the layer l exceeds 0, that is, when the abstraction processing unit 310 of a subsequent layer is a target, the abstraction processing unit 310 performs a convolution process of a processing result $E_{l-1}^t$ of the difference deriving unit 330 of an immediately previous layer and with a filter (e.g., predetermined filter). For example, when the layer l of the processing target is a second layer, the abstraction processing unit 310 convolutes an image which is the processing result $E_{l-1}^t$ of the difference deriving unit 330 and a filter (e.g., predetermined filter) (e.g., obtains an inner product), and compresses an image region including a plurality of pixels overlapping with the filter into one unit region. A value acquired by the convolution is associated with the unit region as a feature quantity. The abstraction processing unit 310 repeats the convolution process while shifting a filter (e.g., predetermined filter) on the image and generates an image formed by a plurality of unit regions (hereinafter "convolutional layer") (CONV($E_{l-1}^t$)). At this time, the abstraction processing unit 310 performs padding at the time of convolution, so that the convolutional layer has the same size as the image of the processing result $E_{l-1}^t$. The abstraction processing unit 310 couples the respective convolutional layers through the ReLU function (normalized linear function) (RELU(CONV($E_{l-1}^t$))). The abstraction processing unit 310 compresses the size of each of a plurality of coupled convolutional layers using a method called max pooling (MAXPOOL(RELU(CONV($E_{l-1}^t$)))), and abstracts the image which is the processing result $E_{l-1}^t$. Then, the abstraction processing unit 310 outputs the abstracted image as the processing result $A_l^t$.

The prediction generating unit 320 performs a process based on Formula (2) and outputs a processing result $A(hat)_l^t$. The prediction generating unit 320 may be realized by, for example, a convolutional neural network.

$$\hat{A}_l^t = RELU(CONV(R_l^t)) \quad (2)$$

For example, when the layer l of the processing target is the first layer, the prediction generating unit 320 convolutes the image which is the processing result $R_l^t$ of the regression processing unit 340 of the same layer and a filter (e.g., predetermined filter), and compresses an image region including a plurality of pixels overlapping with a filter (e.g., predetermined filter) into one unit region. As described above, the value acquired by convolution is associated with the unit region as the feature quantity. The prediction generating unit 320 repeats the convolution process while shifting a filter (e.g., predetermined filter) on the image and generates a convolutional layer formed by a plurality of unit regions (CONV($R_l^t$)). At this time, the prediction generating unit 320 performs padding at the time of convolution so that the convolutional layer has the same size as the image of the processing result $R_l^t$. The prediction generating unit 320 couples the respective convolutional layers through the ReLU function (RELU(CONV($E_{l-1}^t$))) and outputs the result as the processing result $A(hat)_l^t$. The processing result $A(hat)_l^t$ by the prediction generating unit 320 of the first layer indicates the predicted image data.

The difference deriving unit 330 performs a process based on Formula (3) and outputs the processing result $E_l^t$.

$$E_l^t = [RELU(A_l^t - \hat{A}_l^t); RELU(\hat{A}_l^t - A_l^t)] \quad (3)$$

For example, the difference deriving unit 330 calculates a difference $(A_l^t - A(hat)_l^t)$ obtained by subtracting the processing result $A(hat)_l^t$ from the processing result $A_l^t$ and a difference $(A(hat)_l^t - A_l^t)$ obtained by subtracting the processing result $A_l^t$ from the processing result $A(hat)_l^t$, and outputs the output value of the ReLU function using the differences as the processing result $E_l^t$.

The regression processing unit 340 performs a process based on Formula (4) and outputs the processing result $R_l^t$. For example, the prediction generating unit 320 may be realized by a combination of the convolutional neural network and a recurrent network (e.g., a recurrent neural network (RNN)) in which a middle layer of the network is a long short-term memory (LSTM) (hereinafter referred to as CONVLSTM). For example, the CONVLSTM is obtained by changing the inner product of a weight and a state variable in a convolution manner in a calculation formula of each gate of the LSTM.

$$R_l^t = \text{CONVLSTM}(E_l^{t-1}, R_l^{t-1}, \text{UPSAMPLE}(R_{l+1}^t)) \qquad (4)$$

For example, the regression processing unit 340 calculates the CONVLSTM on the basis of the previous processing result $E_l^{t-1}$ of the difference deriving unit 330 temporarily stored in a memory region (an LSTM block) called a memory cell of the LSTM, its own previous processing result $R_l^{t-1}$, and the processing result $R_{l+1}^t$ of the regression processing unit 340 of the subsequent layer, and outputs the calculation result as the processing result $R_l^t$. When the size of the image which is the processing result $R_{l+1}^t$ of the subsequent regression processing unit 340 is different from the size of the input actual image data $x_t$, the regression processing unit 340 performs up-sampling on the size of the input image as the processing result $R_{l+1}^t$ from the subsequent stage so that it is adjusted to the size of the actual image data $x_t$. As a result, the sizes of the images are unified in each target layer. Further, the regression processing unit 340 causes the processing result $R_l^t$ which is currently acquired and the processing result $E_l^t$ which is currently acquired by the difference deriving unit 330 of the same layer to be stored in the memory cell of the LSTM.

If the PredNet 300 is generated, the learning processing unit 212 determines whether or not the process of generating the predicted image data is an initial process (S202), and when it is determined that the process of generating the predicted image data is the initial process, the learning processing unit 212 sets the output value $R_l^t$ of the regression processing unit 340 of each layer and the output value $E_l^t$ of the difference deriving unit 330 to the initial value (for example, 0) and generates the predicted image data $A(\text{hat})_l^t$ (S204).

For example, when the PredNet 300 includes a total of two layers, that is, the l-th layer and a (l+1)-th layer after the l-th layer, and n is 1, the regression processing unit 340 of the (l+1)-th layer sets an output value $E_{l+1}^{t-1}$ of a previous period t−1 by the previous difference deriving unit 330 of the (l+1)-th layer to the initial value, sets the output value $R_{l+1}^{t-1}$ to the initial value since the output value $R_{l+1}^{t-1}$ of its own previous period t−1 is not stored in the memory cell of the LSTMs, and derives an output value $R_{l+1}^t$ of the current period t. At this time, the regression processing unit 340 of the (l+1)-th layer causes the derived output value $R_{l+1}^t$ of the current period t to be stored in the memory cell of the LSTM.

The regression processing unit 340 of the l-th layer sets the output value $E_l^{t-1}$ of the previous period t−1 by the difference deriving unit 330 of the l-th layer to the initial value, sets the output value $R_l^{t-1}$ to the initial value since the output value $R_l^{t-1}$ of its own previous period t−1 is not stored in the memory cell of the LSTM, and derives the output value $R_l^t$ of the current period t on the basis of the initial values $E_l^{t-1}$ and $R_l^{t-1}$ and the output value $R_{l+1}^t$ of the current period t derived by the regression processing unit 340 of the (l+1)-th layer. At this time, the regression processing unit 340 of the l-th layer causes the derived output value $R_l^t$ of the current period t to be stored in the memory cell of the LSTM.

The prediction generating unit 320 of the l-th layer derives the output value $A(\text{hat})_l^t$ of the current period t on the basis of $R_l^t$ derived by the regression processing unit 340 of the l-th layer. Accordingly, the predicted image data $A(\text{hat})_l^t$ of the current period t is generated.

Then, the learning processing unit 212 calculates a difference between the predicted image data $A(\text{hat})_l^t$ generated on the basis of the initial values $R_l^{t-1}$ and $E_l^{t-1}$ and the actual image data $x_t$ acquired in the current period t (S206). For example, if the actual image data $x_t$ of the period t is acquired by the information processing device side communication unit 202, the learning processing unit 212 inputs the actual image data $x_t$ of the period t to the abstraction processing unit 310 of the l-th layer. In the case of the initial process, the abstraction processing unit 310 of the l-th layer outputs the actual image data $x_t$ acquired by the information processing device side communication unit 202 to the difference deriving unit 330 of the l-th layer without change. In response to this, the difference deriving unit 330 of the l-th layer derives the difference $E_l^t$ corresponding to the current one period t on the basis of the predicted image data $A(\text{hat})_l^t$ generated by the prediction generating unit 320 of the l-th layer and the actual image data $x_t$ output by the abstraction processing unit 310 of the l-th layer.

Then, the learning processing unit 212 derives a feature quantity of the image from the difference the derived image data (S208). For example, the abstraction processing unit 310 of the (l+1)-th layer derives a feature quantity $A_{l+1}^t$ obtained by abstracting the image of the image data of the current period t on the basis of the difference $E_l^t$ derived by the difference deriving unit 330 of the l-th layer.

Then, the learning processing unit 212 derives a future feature quantity of an image (hereinafter referred to as a predicted feature quantity) on the basis of the output value $R_{l+1}^t$ of the current period t (S210). For example, the prediction generating unit 320 of the (l+1)-th layer derives a predicted feature quantity $A(\text{hat})_{l+1}^t$ predicted to be obtained from the image data of the future period t+1 on the basis of the output value $R_{l+1}^t$ of the current period t derived by the regression processing unit 340 of the (l+1)-th layer. The predicted feature quantity $A(\text{hat})_{l+1}^t$ indicates the feature quantity of the image data of the future period t+1 which is obtained only in the current period t.

Then, the learning processing unit 212 calculates a difference between the feature quantity $A_{l+1}^t$ acquired from the image data of the current period t and the predicted feature quantity $A(\text{hat})_{l+1}^t$ predicted to be obtained from the image data of the future period t+1 (S212). For example, the difference deriving unit 330 of the (l+1)-th layer obtains a difference $(A_{l+1}^t - A(\text{hat})_{l+1}^t)$ obtained by subtracting the predicted feature quantity $A(\text{hat})_{l+1}^t$ of the current period t from the feature quantity $A_{l+1}^t$ of the current period t and a difference $(A(\text{hat})_{l+1}^t - A_{l+1}^t)$ obtained by subtracting the feature quantity $A_{l+1}^t$ of the current period t from the predicted feature quantity $A(\text{hat})_{l+1}^t$ of the current period t, and derives a difference $E_{l+1}^t$ of the feature quantity of the current period t using the differences as variables of the ReLU function. Accordingly, the process corresponding to one period in the initial process ends.

On the other hand, when it is determined that the process of generating the predicted image data is not the initial process in the process of S202, the learning processing unit 212 generates the predicted image data on the basis of the output values of the previous period of the regression processing unit 340 and the difference deriving unit 330 of each layer (S214).

For example, when the current period is t+1 which is a period advanced from the initial period t by one period, the regression processing unit 340 of the (l+1)-th layer derives an output value $R_{l+1}^{t+1}$ the current period t+1 on the basis of output value $E_{l+1}^{t}$ of the previous period t by the difference deriving unit 330 of the (l+1)-th layer (the processing result of S212) and the output value $R_{l+1}^{t}$ of the previous period t stored in the memory cell of the LSTM. At this time, the regression processing unit 340 of the (l+1)-th layer causes the derived output value $R_{l+1}^{t+1}$ of the current period t+1 to be stored in the memory cell of the LSTM.

The regression processing unit 340 of the l-th layer derives an output value $R_{l}^{t+1}$ of the current period t+1 on the basis of the output value $E_{l}^{t}$ of the previous period t by the difference deriving unit 330 of the l-th layer, the previous output value $R_{l}^{t}$ of the previous period t stored in the memory cell of the LSTM, and the output value $R_{l+1}^{t+1}$ of the current period t+1 derived by the regression processing unit 340 of the (l+1)-th layer. At this time, the regression processing unit 340 of the l-th layer causes the derived output value $R_{l}^{t+1}$ of the current period t+1 to be stored in the memory cell of the LSTM.

The prediction generating unit 320 of the l-th layer derives an output value $A(hat)_{l}^{t+1}$ of the current period t+1 on the basis of $R_{l}^{t+1}$ derived by the regression processing unit 340 of the l-th layer. Accordingly, the predicted image data $A(hat)_{l}^{t+1}$ of the current period t+1 is generated.

Then, the learning processing unit 212 abstracts actual image data $x_{t+1}$ acquired in the current period t+1 by the convolution process and the max pooling as a process of S206, and derives a difference between the predicted image data $A(hat)_{l}^{t+1}$ generated on the basis of $R_{l}^{t}$ and $E_{l}^{t}$ which are derivation results of the previous period t and the abstracted actual image data $x_{t+1}$.

Then, the learning processing unit 212 derives a feature quantity $A_{l+1}^{t+1}$ acquired by abstracting the image data of the current period t+1 on the basis of the derived difference $E_{l}^{t+1}$ of the image data as a process of S208.

Then, the learning processing unit 212 derives a predicted feature quantity $A(hat)_{l+1}^{t+1}$ predicted to be obtained from image data of a future period t+2 on the basis of the regression processing result $R_{l+1}^{t+1}$ of the current period t+1 as a process of S210.

Then, the learning processing unit 212 derives a difference $E_{l+1}^{t+1}$ between the feature quantity $A_{l+1}^{t+1}$ acquired from the image data of the current period t+1 and the predicted feature quantity $A(hat)_{l+1}^{t+1}$ predicted to be obtained from the image data of the future period t+2 as a process of S212. Accordingly, the process corresponding to one period in the second and subsequent processes ends.

Figure 9:
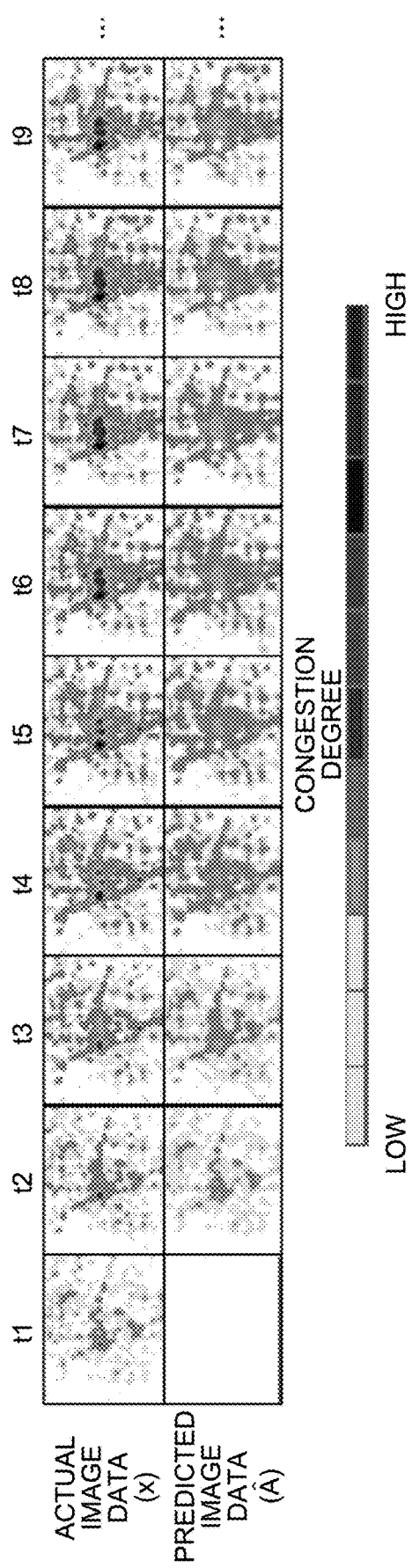
FIG. 9 is a diagram in which actual image data and predicted image data of respective periods are arranged and displayed.

FIG. 9 is a diagram in which the actual image data and the predicted image data of respective periods are arranged and displayed. In FIG. 9, t1 represents an initial period, and it means that predicted image data has never been generated. For example, if actual image data $x_{t1}$ is acquired at a time point of the period t1, the learning processing unit 212 inputs the actual image data $x_{t1}$ to the PredNet 300, and generates predicted image data $A(hat)_{l}^{t1}$ predicted to be obtained at a time point of a period t2. Further, if actual image data $x_{t2}$ is acquired at a time point of the period t2, the learning processing unit 212 inputs the actual image data $x_{t2}$ to the PredNet 300, generates predicted image data $A(hat)^{t2}$ predicted to be obtained at a time point of a period t3. As described above, the period is repeated, and predicted image data after one period is generated each time actual image data is acquired. Accordingly, the predicted image data is sequentially transmitted from the information processing device 200 to the information providing device 100.

Figure 10:
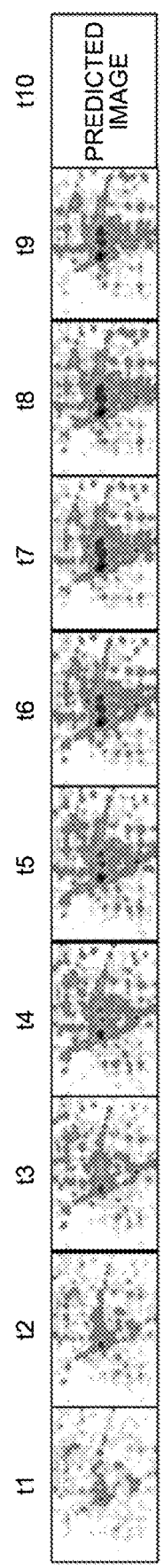
FIG. 10 is a diagram illustrating an example of content provided from the information providing device 100 to a terminal device 10.

FIG. 10 is a diagram illustrating an example of content provided from the information providing device 100 to the terminal device 10. In a case in which the information providing device 100 continuously transmits the actual image data of the respective periods t1 to t9 sequentially to the information processing device 200 to generate the predicted image data, the information processing device 200 generates predicted image data $A(hat)^{t9}$ of a period t10 next to a period t9, and transmits the predicted image data $A(hat)^{t9}$ to the information providing device 100. Upon receiving the predicted image data $A(hat)^{t9}$ from the information processing device 200, the information providing device 100 provides content including the actual image data $x_{t1}$ to $x_{t9}$ which has been continuously transmitted to the information processing device 200 so far and the predicted image data $A(hat)^{t9}$ obtained from predicting actual image data $x_{t10}$ of a period t10 to the terminal device 10. Accordingly, the congestion degree to the present and the future congestion degree are displayed on a screen of terminal device 10 as the heat map.

In the above example, the information processing device 200 has been described as generating the predicted image data in which the congestion degree of a future time (period) t+n which is one period n after the time (period) t at which the actual image data is generated is used as the pixel value, but not limited thereto. For example, the information processing device 200 may predicts the predicted image data of the future time (period) t+n after one period n and the predicted image data of the future time t+kn which is one or more periods n after the future time (period) t+n. "n" indicates a period as described above, and "k" indicates a natural number (e.g., an arbitrary natural number) indicating the number of future periods to be predicted.

For example, in a case in which the current period is t+1, even before or when the actual image data $x_{t+1}$ is acquired by the information processing device side communication unit 202, the abstraction processing unit 310 of the l-th layer which is a first layer regards the predicted image data $A(hat)^{t}$ generated in the previous period t by the prediction generating unit 320 of the l-th layer as the actual image data $x_{t+1}$, and abstracts the actual image data $x_{t+1}$ by performing the convolution process and the max pooling. Upon receiving it, the difference deriving unit 330 of the l-th layer derives the difference $E_{l}^{t+1}$ of the current period t+1 on the basis of the predicted image data $A(hat)^{t+1}$ generated by the prediction generating unit 320 of the l-th layer and the predicted image data $A(hat)^{t}$ abstracted by the abstraction processing unit 310 of the l-th layer. The constituent element of the (l+1)-th layer subsequent to the l-th layer obtains the feature quantity $A_{l+1}^{t+1}$ of the current period t+1 on the basis of the difference $E_{l}^{t+1}$ between the two pieces of predicted image data, and derives the difference $E_{l+1}^{t+1}$ between the feature quantity $A_{l+1}^{t+1}$ and the predicted feature quantity $A(hat)_{l+1}^{t+1}$. The prediction generating unit 320 of the l-th layer generates predicted image data $A(hat)^{t+2}$ predicting the actual image data $x_{t+2}$ of the period t+2 on the basis of the difference $E_{l+1}^{t+1}$. As described above, instead of the actual image data $x_{t+1}$ obtained in the current period t+1, the actual image data $x_{t+2}$ of the future period t+2 is further predicted using the predicted image data $A(hat)^{t}$ predicted as the actual image data $x_{t+1}$ of the current period t+1 at a past time point, and thus it is possible to provide the user with the heat map indicating the future congestion degree as the content.

Further, future actual image data $x_{t+k}$ after k or more periods (for example, k≥2) may be predicted, and in this case, it is possible to provide the user with the heat map indicating the future congestion degree as the content.

Figure 11:
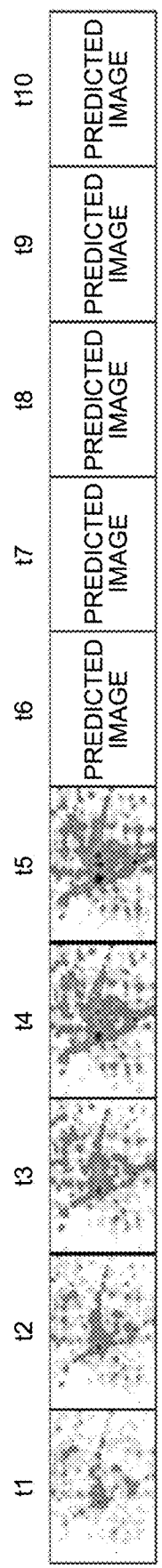
FIG. 11 is a diagram illustrating another example of content provided from the information providing device 100 to the terminal device 10.

FIG. 11 is a diagram illustrating another example of content provided from the information providing device 100 to the terminal device 10. For example, in a case in which the current period is t5, when the future actual image data after 5 periods is predicted, the information processing device 200 transmits predicted image data A(hat)$_t^{t6}$ to A(hat)$^{t10}$ of periods t6 to t10 to the information providing device 100. Upon receiving it, as illustrated in FIG. 11, the information providing device 100 provides content including actual image data $x_{t1}$ to $x_{t5}$ up to the current period t5 and the predicted image data A(hat)$^{t6}$ to A(hat)$^{t10}$ corresponding to the future 5 periods to the terminal device 10. Accordingly, it is possible to further improve the convenience of the user as compared with a case in which a future congestion degree after one period is displayed as the heat map.

Process Flow at Time of Learning

Figure 12:
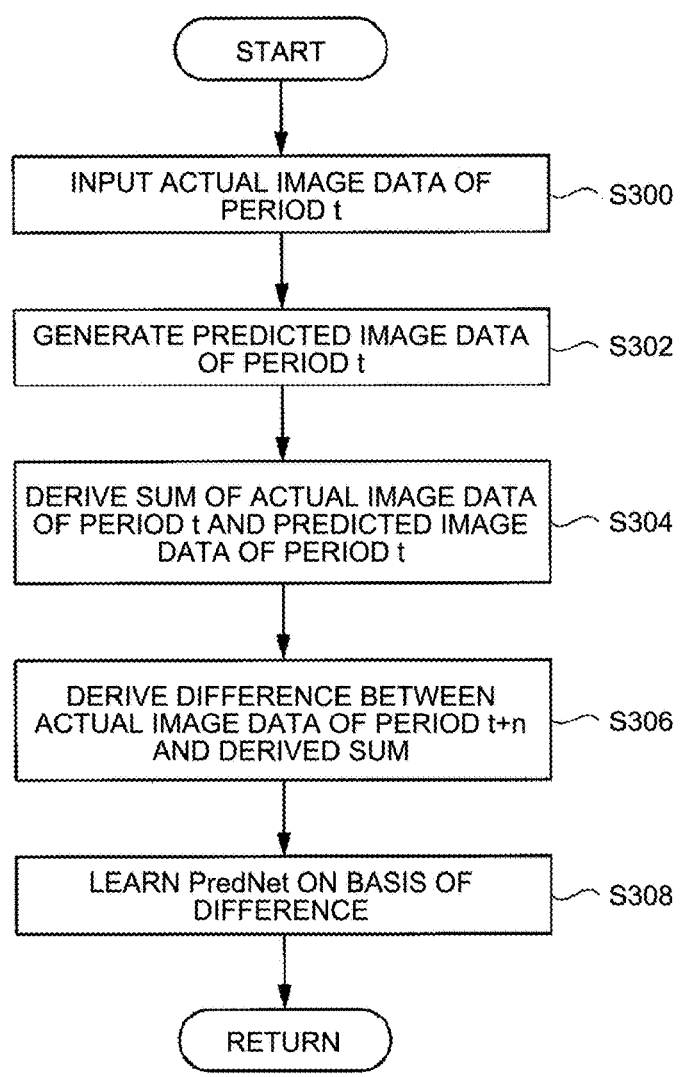
FIG. 12 is a flowchart illustrating a flow of a series of processes when learning is performed by the information processing device 200.

A flow of a series of processes when learning is performed by the information processing device 200 will be described below with reference to flowcharts. The term "when learning is performed" indicates a state in which a learning model used at the time of operation, that is, the PredNet 300 is learned. FIG. 12 is a flowchart illustrating a flow of a series of processes when learning is performed by the information processing device 200. A process of the present flowchart may be repeated, for example, at a period (e.g., predetermined period).

First, if the actual image data $x_t$ is acquired by the information processing device side communication unit 202 in the current period t, the learning processing unit 212 inputs actual image data $x_t$ to the PredNet 300 (S300), and generates the predicted image data A(hat)$^t$ in which the congestion degree of the future time t+n which is one period n after the time t at which the actual image data $x_t$ is generated in the information providing device 100 is used as the pixel value (S302).

Then, the learning processing unit 212 derives a sum y (=$x_t$+A(hat)$^t$) of the actual image data $x_t$ acquired at the time point of the period t and the predicted image data A(hat)$^t$ generated at the time point of the period t (S304).

Then, if the current period is t+n, and the actual image data $x_{t+n}$ is acquired by the information processing device side communication unit 202, the learning processing unit 212 derives a difference ΔE between the actual image data $x_{t+n}$ acquired at the time point of the period t+n and the sum y of the actual image data $x_t$ and the predicted image data A(hat)$^t$ at the time point of the period t (S306).

Then, the learning processing unit 212 learns the PredNet 300 so that the derived difference ΔE is minimized using an error back propagation technique or a stochastic gradient descent technique (S308). For example, the learning processing unit 212 determines (e.g., decides) the parameter of the CONVLSTM which realizes the regression processing unit 340 of each layer so that the difference ΔE is minimized. Examples of the parameter of the CONVLSTM include an input weight, a recurrent weight, a peephole weight, and a bias weight. Further, the learning processing unit 212 may determine (e.g., decide) some or all of the parameters of the abstraction processing unit 310, the prediction generating unit 320, and the difference deriving unit 330. The learning processing unit 212 updates the parameter of the PredNet 300 in the deep learning model information 232 with the parameter determines (e.g., decided) as described above. Accordingly, the process of the present flowchart ends.

Figure 13:
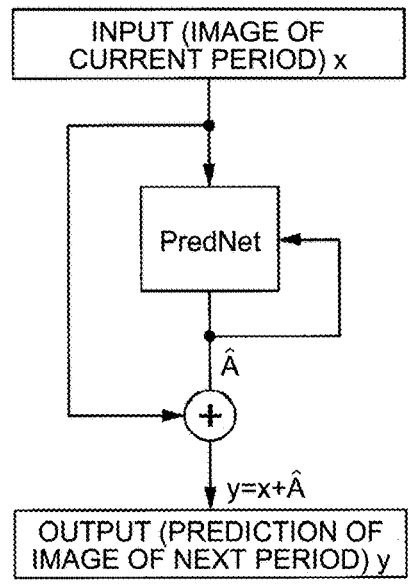
FIG. 13 is a diagram schematically illustrating a flow of learning of the PredNet 300.

FIG. 13 is a diagram schematically illustrating a flow of learning of the PredNet 300. As illustrated in FIG. 13, if the actual image data $x_t$ is input to the PredNet 300, the predicted image data A(hat)$^t$ predicting the actual image data $x_{t+n}$ of the period t+n after the period t is generated. The learning processing unit 212 obtains the sum y of the predicted image data A(hat)$^t$ output from the prediction generating unit 320 of the l-th layer of the PredNet 300 and the actual image data $x_t$ used when the predicted image data A(hat)$^t$ is generated, and uses the sum y as the output of the PredNet 300. Then, when the next processing period t+n arrives, the learning processing unit 212 learns the PredNet 300 on the basis of the difference ΔE between the output y of the period t and the actual image data $x_{t+n}$ acquired from the information providing device 100 in the period t+n, that is, the input $x_{t+n}$ of the period t+n. As described above, the actual image data obtained in the same period (that is, the actual image data input to the PredNet 300 in the same period to generate the predicted image data) is added to the predicted image data generated in each period while the difference between the output value of the subsequent layer of the PredNet 300 and the output value of the preceding layer is gradually reduced, and the PredNet 300 is learned as the supervised learning model so that the difference ΔE between the sum y of the actual image data of the same period which is the addition result and the predicted image data and the actual image data input to the PredNet 300 in the next period is minimized, and thus it is possible to generate the predicted image data with higher accuracy at the time of operation.

According to the first example implementation described above, the information processing device side communication unit 202 that acquires the actual image data $x_t$ in which the observation value observed at a certain time t is used as the pixel value and the learning processing unit 212 that generates the predicted image data A(hat)$_t^t$ in which the observation value predicted to be observed at a time t+n after the time t is used as the pixel value from the actual image data $x_t$ of the time t on the basis of the PredNet 300 learned in advance by deep learning using the actual image data x are provided, and the learning processing unit 212 learns the PredNet 300 on the basis of a comparison of actual image data $x_τ$ obtained at a certain target time τ and predicted image data A(hat)$_t^τ$ in which an observation value predicted to be obtained at the target time τ is used as the pixel value, and it is possible to obtain a future observation value appropriately.

Second Example Implementation

A second example implementation will be described below. In the first example implementation described above, the actual image data x input to the PredNet 300 has been described as being the three-dimensional tensor data in which the congestion degree is associated with each coordinate of the map. On the other hand, the second example implementation differs from the first example implementation in that the actual image data x input to the PredNet 300 is four-or more dimensional tensor data. The following description will proceed focusing on the difference from the first example implementation, and description of points common to the first example implementation will be omitted. In the description of the second example implementation, the same parts as those in the first example implementation are denoted by the same reference numerals.

For example, the actual image data x in the second example implementation may be four-dimensional tensor data in which the congestion degree is associated with each coordinate of the map and is associated with the acquisition time of the position information used when the congestion degree is derived. In other words, the actual image data x may be multi-dimensional sequence data in which a sequence of each coordinate axis, a sequence of congestion degrees, and a sequence of acquisition times are combined. The acquisition time of the position information is an example of the "measurement time of the observation value".

The learning processing unit 212 of the second example implementation learns the PredNet 300 in advance on the basis of the actual image data x when the actual image data x is the four-dimensional tensor data. Accordingly, it is possible to generate the predicted image data in which the future congestion degree is used as the pixel value for each time or each time zone at the time of operation. Further, since the actual image data x is the four-dimensional tensor data including the acquisition time of the position information, it is possible to generate the predicted image data in which the future congestion degree is used as the pixel value for each day of the week, each day, or each season. Accordingly, for example, it is possible to generate the predicted image data of a specific day of the week (for example, Friday), a specific season, or a specific holiday (for example, New Year's Eve, New Year's Day, or the like) can be generated.

Further, the observation value included in the actual image data x as the pixel value is not limited to the congestion degree of people and may be the congestion degree of other moving bodies such as automobiles or airplanes or may be a certain value which changes with the passage of time such as temperature, or humidity, rainfall, concentration of fine particulate matters such as pollens, or the like.

According to the second example implementation described above, since the PredNet 300 is learned on the basis of the actual image data which is the four-or more multi-dimensional sequence data, it is possible to generate the predicted image data which is the four-or more multi-dimensional sequence data at the time of operation. Accordingly, if time information is included in the actual image data, the time information is included in the predicted image data as well, and thus when the content including the predicted image data is provided to the terminal device 10, the user using terminal device 10 can understand a time zone in which congestion is likely to occur. Accordingly, the convenience of the user using the terminal device 10 can be further improved.

Hardware Configuration

Figure 14:
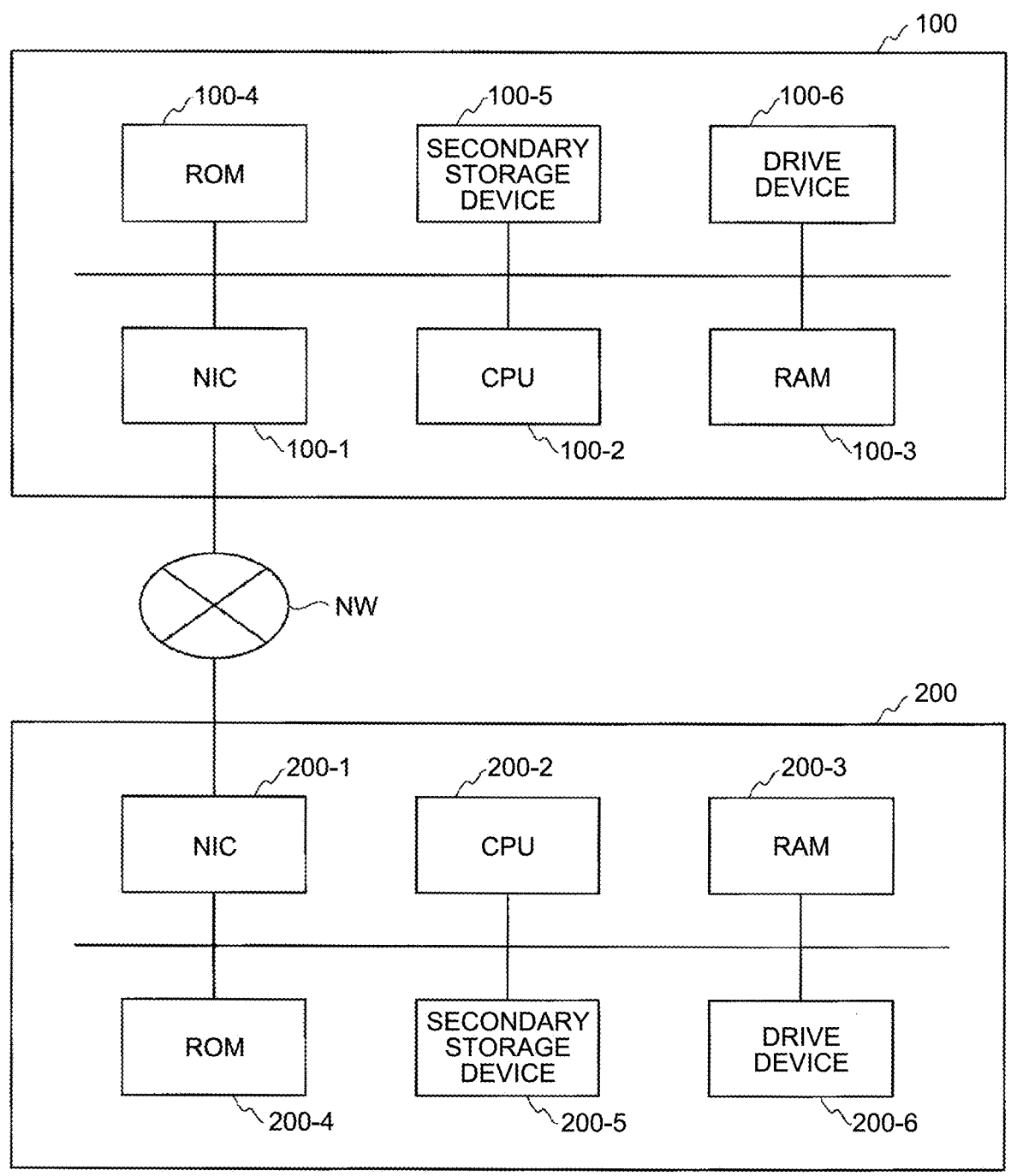
FIG. 14 is a diagram illustrating an example of a hardware configuration of the information providing device 100 and the information processing device 200 of an example implementation.

The information providing device 100 and the information processing device 200 of the example implementations described above are realized by, for example, a hardware configuration illustrated in FIG. 14. FIG. 14 is a diagram illustrating an example of a hardware configuration of the information providing device 100 and the information processing device 200 according to an example implementation.

The information providing device 100 has a configuration in which an NIC 100-1, a CPU 100-2, a RAM 100-3, a ROM 100-4, a secondary storage device 100-5 such as a flash memory or an HDD, and a drive device 100-6 are connected to one another via an internal bus or a dedicated communication line. A portable storage medium such as an optical disk is loaded onto the drive device 100-6. A program (e.g., non-transitory computer readable medium including stored instructions executed by a microprocessor) stored in the secondary storage device 100-5 or a portable storage medium loaded onto the drive device 100-6 is extracted onto the RAM 100-3 by a DMA controller (not illustrated) or the like and executed by the CPU 100-2, so that the information providing device side control unit 110 is realized. The program referred to by the information providing device side control unit 110 may be downloaded from another device via the network NW.

The information processing device 200 has a configuration in which an NIC 200-1, a CPU 200-2, a RAM 200-3, a ROM 200-4, a secondary storage device 200-5 such as a flash memory or an HDD, and a drive device 200-6 are connected to one another via an internal bus or a dedicated communication line. A portable storage medium such as an optical disk is loaded onto the drive device 200-6. A program (e.g., non-transitory computer readable medium including stored instructions executed by a microprocessor) stored in the secondary storage device 200-5 or a portable storage medium loaded onto the drive device 200-6 is extracted onto the RAM 200-3 by a DMA controller (not illustrated) or the like and executed by the CPU 200-2, so that the information processing device side control unit 210 is realized. The program (e.g., non-transitory computer readable medium including stored instructions executed by a microprocessor) referred to by the information processing device side control unit 210 may be downloaded from another device via the network NW.

According to one aspect, a future observation value can be obtained more suitably.

Although the inventive concept has been described with respect to specific example implementations for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing device, comprising:
a communication interface configured to acquire first image data comprising observation values observed at a time t as pixel values; and
at least one processor configured to generate second image data comprising observation values predicted to be observed at a time t+n after the time t as pixel values, the predicted observations values are generated from the first image data acquired by the communication interface based on a learning model obtained by machine learning using the first image data,
wherein the machine learning is based on a comparison of the first image data in which an observation value observed at a target time is used as a pixel value, and the second image data in which an observation value predicted to be observed at the target time is used as a pixel value.

2. The information processing device according to claim 1,
wherein the machine learning comprises deep learning.

3. The information processing device according to claim 2,
wherein the learning model comprises a PredNet.

4. The information processing device according to claim 1,
wherein the communication interface is further configured to acquire first image data comprising observation values observed at the time t+n as pixel values, and when the first image data in which the observation values observed at the time t+n is used as the pixel values is acquired by the communication interface, the at least one processor is further configured to generate new second image data comprising observation values predicted to be observed at a time t+kn after the time t+n as pixel values, the predicted observation values for the new second image data are generated from the first image data based on the learning model.

5. The information processing device according to claim 1,
wherein the at least one processor is further configured to generate new second image data comprising observation values predicted to be observed at a time t+kn after the time t+n as pixel values, the predicted observation values for the new second image data are generated from the second image data in which the observation values predicted to be observed at the time t+n are used as a pixel values based on the learning model.

6. The information processing device according to claim 1,
wherein a measurement time of the observation values is further added to the first image data as an element.

7. The information processing device according to claim 1,
wherein the observation values is a congestion degree indicating a degree of congestion of one or more users.

8. The information processing device according to claim 1,
wherein the at least one processor is further configured to:
derive a sum of the second image data in which the observation values predicted to be observed at the target time are used as pixel values and the first image data of a time prior to the target time, and
determine a parameter of the learning model by the machine learning based on a difference between the derived sum and the first image data in which the observation values observed at the target time are used as pixel values.

9. An information processing device, comprising:
a communication interface configured to acquire first multi-dimensional sequence data including an observation value observed at a time t as one sequence; and
at least one processor configured to generate second multi-dimensional sequence data including an observation value predicted to be observed at a time t+n after the time t as another sequence from the first multi-dimensional sequence data acquired by the communication interface based on a learning model acquired by machine learning using the first multi-dimensional sequence data,
wherein the machine learning occurs based on a comparison of the first mufti-dimensional sequence data including an observation value observed at a certain target time as the one sequence and the second multi-dimensional sequence data including an observation value predicted to be observed at the target time as the another sequence.

10. A computer-implemented information processing method, the method comprising:
acquiring, by a computer, first image data comprising observed observation values observed at a time t as pixel values; and
generating, by the computer, second image data comprising predicted observation values predicted to be observed at a time t+n after the time t as pixel values, the predicated observations values generated from the acquired first image data based on a learning model obtained by machine learning using the first image data,
wherein the machine learning is based on a comparison of the first image data in which an observation value observed at a target time is used as a pixel value and the second image data in which an observation value predicted to be observed at the target time is used as a pixel value.

11. A non-transitory computer-readable storage medium having stored therein one or more executable instructions, the one or more instructions comprising:
acquiring first image data comprising observed observation values observed at a time t as pixel values; and
generating second image data comprising predicted observation values predicted to be observed at a time t+n after the time t as pixel values, the predicated observations values generated from the acquired first image data based on a learning model obtained by machine learning using the first image data,
wherein the machine learning is based on a comparison of the first image data in which an observation value observed at a target time is used as a pixel value and the second image data in which an observation value predicted to be observed at the target time is used as a pixel value.

12. The non-transitory computer-readable storage medium of claim 11,
wherein the machine learning comprises deep learning.

13. The non-transitory computer-readable storage medium of claim 12,
wherein the learning model comprises a PredNet.

14. The non-transitory computer-readable storage medium of claim 11,
wherein the acquiring further comprises a communication interface acquiring first image data comprising observation values observed at the time t+n as pixel values, and
when the first image data in which the observation values observed at the time t+n is used as the pixel values is acquired by the communication interface, the generating comprises at least one processor generating new second image data comprising observation values predicted to be observed at a time t+kn after the time t+n as pixel values, the predicted observation values for the new second image data are generated from the first image data based on the learning model.

15. The non-transitory computer-readable storage medium of claim 11,
wherein the generating comprises at least one processor generating new second image data comprising observation values predicted to be observed at a time t+kn after the time t+n as pixel values, the predicted observation values for the new second image data are generated from the second image data in which the observation values predicted to be observed at the time t+n are used as a pixel values based on the learning model.

16. The non-transitory computer-readable storage medium of claim 11,
further comprising adding a measurement time of the observation values to the first image data as an element.

17. The non-transitory computer-readable storage medium of claim 11,
wherein the observation values is a congestion degree indicating a degree of congestion of one or more users.

18. The non-transitory computer-readable storage medium of claim 11,
the generating further comprising:
deriving a sum of the second image data in which the observation values predicted to be observed at the target time are used as pixel values and the first image data of a time prior to the target time, and
determining a parameter of the learning model by the machine learning based on a difference between the derived sum and the first image data in which the observation values observed at the target time are used as pixel values.

* * * * *